United States Patent [19]
Hain et al.

[11] Patent Number: 6,119,589
[45] Date of Patent: Sep. 19, 2000

[54] APPARATUS FOR OBTAINING CHEESE MATERIAL FROM MILK

[75] Inventors: Gottfried Hain, Pfaffing; Siegfried Dürmeier, Kartl; Johann Pypetz, Pfaffing; Stefan Holzner, Zaisering, all of Germany

[73] Assignee: ALPMA Alpenland Maschinenbau GmbH, Rott am Inn, Germany

[21] Appl. No.: 09/169,695

[22] Filed: Oct. 9, 1998

[30] Foreign Application Priority Data

Oct. 21, 1997 [DE] Germany ............................ 197 46 409

[51] Int. Cl.[7] .............................. A01J 25/00; A01J 25/11; A23C 19/00
[52] U.S. Cl. ................................ 99/460; 99/453; 99/456; 99/461
[58] Field of Search ...................... 99/452–456, 460–466, 99/517, 583; 366/102–104; 426/34, 36, 38, 582, 519, 491, 495

[56] References Cited

U.S. PATENT DOCUMENTS

| | | | |
|---|---|---|---|
| 4,108,057 | 8/1978 | Hain et al. | 99/452 |
| 4,306,493 | 12/1981 | Hain et al. | 99/459 |
| 4,321,861 | 3/1982 | Hain et al. | 99/455 |
| 4,332,831 | 6/1982 | Rust | 426/582 |
| 5,688,542 | 11/1997 | Tortosa . | |

FOREIGN PATENT DOCUMENTS

0818139A1  1/1998  European Pat. Off. .
19531601A1  3/1997  Germany .

Primary Examiner—Timothy Simone
Attorney, Agent, or Firm—Townsend and Townsend and Crew LLP

[57] ABSTRACT

An apparatus for obtaining cheese material from milk has an elongate trough (11) which is provided at its one end with a filling zone (16) and, at its other end, a discharge zone (19). The trough has an inner wall (12) which is transportable at least substantially continuously between the filling zone (16) and the discharge zone (19). The volume of the trough can be subdivided by a number of partition walls (31, 31') which are matched to the trough cross-section, which can be coupled to the inner wall (12), and which are movable jointly with the Latter into cells (32, 32') which follow one another in the longitudinal direction. A clamping device (41) is associated with each partition wall (31, 31') and permits the inner wall (12) of the trough, which consists of a flexible material, to be clamped with slight deformation about the region (34) of the periphery of the partition wall confronting it. A mechanically stable connection, which seals adjacent cells (32, 32') relative to one another, is thereby produced between the confronting regions of the inner wall (12) of the trough and the partition wall (31, 31'). The associated clamping device (41) permits coupling of one partition wall (31, 31') to the inner wall (12) of the trough at an angle of inclination (48) with respect to the vertical.

17 Claims, 4 Drawing Sheets

APPARATUS FOR OBTAINING CHEESE MATERIAL FROM MILK

BACKGROUND OF THE INVENTION

The invention relates to an apparatus for obtaining cheese material from milk.

Such apparatuses serve for the preparation of cheese fractions from previously pasteurized milk in a continuous process. An apparatus of this kind is disclosed in German patent publication DE 195 31 601 A1. It has a trough with an inner wall formed as an endless dished belt which is continuously transported in a longitudinal transport direction from a milk filling zone via at least one coagulation zone and a fraction cutting zone to a discharge zone.

In order for the milk to be able to coagulate homogeneously and free of disturbance during the transport within the trough it must be transported in a flow-free, turbulence-free and vibration-free manner. For this, partition walls with a semi-circular outline are inserted at substantially equidistant intervals into the inner wall of the trough perpendicular to its longitudinal direction. The inner volume of the trough is thereby subdivided into cells in which the coagulation process can take place free of disturbance. A clamping device is associated with each partition wall by means of which the inner wall of the trough consisting of resilient material can be tensioned with slight deformation about the round region of the periphery of the partition wall confronting it. In this way a stable connection is obtained between the inner wall of the trough and the partition wall which seals neighboring cells relative to one another.

The known apparatus has the disadvantage that a partition wall coupled to the inner wall of the trough is in many cases not able to withstand the pressure of the difference in filling level which results when bounding differently filled cells. The partition wall can yield to the hydrostatic pressure of the content of the more filled cell. The end face of the partition wall confronting the inner wall of the trough then slides along the inner wall of the trough so that the lower side of the partition wall tilts in the direction of the less filled cell.

BRIEF SUMMARY OF THE INVENTION

It is an object of the invention to provide an apparatus for obtaining cheese material from milk in such a way that with a simple construction, and also an uncomplicated control sequence of the cell filling, the partition walls between the cells can better withstand the pressure of a difference in the filled level between neighboring cells. Furthermore, the invention enables a flow free continuous transport of the milk, or of the coagulate, and in a simple manner allows one to comply with hygiene regulations.

In accordance with the invention this object is satisfied in that at least one partition wall can be coupled by means of the associated clamping device to the inner wall of the trough inclined at an angle of inclination with respect to the vertical.

Since the partition walls are inserted into the inner wall of the trough in an inclined position and clamped to it, they can withstand a higher one-sided pressure load. In comparison to the customary alignment of a partition wall, in which it is arranged within a vertical plane perpendicular to the longitudinal direction of the trough, the downwardly pointing end of the partition wall confronting the inner wall of the trough provided in accordance with the apparatus of the invention is tilted with respect to its upper end in a direction parallel to the longitudinal direction of the trough, so that the partition wall extends obliquely relative to the vertical direction in the side cross-section. In this respect the lower end of a partition wall is normally displaced relative to the upper end in the direction towards that cell from which a higher pressure load arises, i.e. which is to be filled to a higher filling level or filled with a heavier liquid than the neighboring cell bounded by the oblique partition wall.

In the following a partition wall is designated as being inclined towards the cell into the lower region of which it projects as a result of its inclined arrangement, and the upper region of the cell, from which it points away. A partition wall inclined towards a cell thus bounds this cell in such a way is that the cell has the profile of a trough in the side cross-section, i.e. in a cross-section taken in the longitudinal direction of the belt. In this sense the partition wall is termed as being inclined away from the cell which is adjacent to the named cell via the oblique partition wall.

Moreover, the angle of inclination of a partition wall arranged inclined relative to the vertical is calculated from the vertical and is designated as being respectively positive or negative when the partition wall is inclined towards that cell which is respectively provided in front of or behind the partition wall with respect to the transport direction of the inner wall of the trough.

The force exerted by the static pressure acting within a filled cell on a partition wall inclined towards this cell is split-up in accordance with a parallelogram of forces such that a transverse force, i.e. a horizontal force component acting in the longitudinal direction of the belt, presses the partition wall laterally away from the cell and such that the vertical force component presses the transverse wall downwardly. As a result of the oblique arrangement of the partition wall it thus advantageously experiences a lower force in the horizontal direction than a vertically aligned partition wall. The vertically downwardly acting force component, which does not arise with a vertically arranged partition wall, brings about an additional frictional force between the lower region of the end surface of the partition wall facing the inner wall of the trough and the inner wall of the trough.

Thus, if the cell to which the partition wall is inclined is filled to a higher filling level with a liquid than the oppositely disposed cell with respect to the partition wall, lower transverse forces act on this inclined partition wall than on a corresponding vertical partition wall. Moreover, advantageous vertical forces which enhance the friction act on the partition wall. Thus the partition walls can, with the design of the invention, withstand a higher hydrostatic loading. In particular, by applying the same clamping forces via the clamping apparatus as was done in the past the partition walls can bound, at least for a period of time, a fully filled cell relative to an empty cell without an undesired tilting of the partition wall.

The inclined arrangement of the partition wall and also the correct choice of the angle of inclination and the direction of the inclination can bring about a self-stabilizaltion of the coupling of the partition wall with the inner wall of the trough (see FIG. 3a). If the content of the cell to which the partition wall is inclined exerts a large force and thus a high horizontal force component on the partition wall it is possible for the end surface of the partition wall to slide along the inner wall of the trough. If the partition wall is suspended by means of the clamping apparatus at the upper marginal region of the inner wall of the trough then it executes an erecting movement in which the angle of inclination of the partition wall is reduced with respect to the vertical direction. However as the angle of inclination reduces, the projection of the extent of the partition wall onto the vertical increases so that the partition wall has an ever greater extension in the vertical direction. As the inner wall of the trough cannot accommodate this enlarged vertical extension, it shifts the upper end of the partition wall upwardly. This shift brings about an increase of the clamping force which is transmitted by the clamping device onto the partition wall. This can increasingly raise the contact pressure and thus the frictional force between the partition wall and the inner wall of the trough, so that a further erecting movement of the partition wall is self-stabilizingly counteracted and an improved sealing action is achieved.

The possibility of bounding a full cell from an empty one, at least for a period of time, enables a simple design and also simple production sequences of the apparatus. Neighboring cells can each be completely filled one after the other in a direct time sequence. Thus a simple piping arrangement can be provided which can have the filling pipes at small distances from one another.

Moreover, the milk can be filled easily in a constant volume flow into the sequentially following cells. This makes it easier to carry out the milk pasteurizing process provided before the coagulation apparatus and thereby overcomes the necessity of using intermediate and buffer containers and makes it possible to fill the cells to a uniform known filling level, in each case without complicated valve and control technology.

Furthermore, the filling of a cell can take place close to the starting position of this cell, i.e. directly after the insertion of its partition walls into the inner wall of a trough. In this way the coagulation process can already be started very close to the starting position, for example by the addition of rennet, culture or other additives. The apparatus thus has a length which is only insignificantly greater than the length of the apparatus required for the actual production process.

The operation of the apparatus with a leading or trailing cell half-filled with water is only still theoretically necessary to avoid unpredictable disturbances of the production sequence. If the apparatus is operated with a leading half cell then only this single leading cell need be half-filled with water, while the following cell can already be fully filled with milk, so that the consumption of water can be minimized.

Through the filling of spatially adjacent cells timewise one after the other it also possible to carry out a change of the milk type directly at adjacent cells in an advantageous manner.

In a preferred embodiment of the apparatus of the invention it is possible to couple the partition wall to the inner wall of the trough selectively pivoted by a positive or a negative angle of inclination relative to the vertical. In this way each partition wall can be connected to the inner wall of a trough, in each case inclined towards that cell from which a higher pressure loading arises and away from the opposite cell with respect to the partition wall.

The inclination of the partition wall and also the contact pressure brought about by the clamping device between the inner wall of the trough and the partition wall, or the deformation of the inner wall of the trough brought about by this contact pressure, should be dimensioned in such a way that the partition wall can ultimately withstand transverse forces which result from a difference in filling level, so that the partition wall remains coupled to the inner wall of a. trough, at least substantially free of movement.

The contact pressure force exerted from the clamping device via the partition wall onto the inner wall of the trough also has a horizontal component with an inclined alignment of the partition wall. In this way, in particular with a lack of counterloading of the partition wall by hydrostatic pressure, the danger can exist that the partition wall tilts in the direction of this horizontal component and thus the direction of a larger angle of inclination or in the direction of the cell to which the partition wall is inclined. The angle of inclination of the partition wall with respect to the vertical is thus preferably so dimensioned that the partition wall can retain its aligned position even without loading by hydrostatic pressure.

The angle of inclination to be selected thereby depends on the contact pressure brought about by the clamping device between the partition wall and the inner wall of the trough, and also on the shape and surface nature of the partial region of the end surface of the partition wall confronting the inner wall of the trough and on the surface nature and the elasticity of the inner wall of the trough. The apparatus of the invention functions particularly well when using known materials with an angle of inclination of the partition walls between 3° and 10°. The angle of inclination preferably amounts between 4° and 7°.

It is possible, with the apparatus of the invention, to couple partition walls of known design to the inner wall of the trough in an inclined position, with the clamping device associated with the partition wall being essentially rigidly connected to the partition wall. This rigid connection can bring about an additional stabilization of the partition wall coupled to the inner wall of the trough against an intended tilting movement caused as a result of hydrostatic pressure acting on the partition wall.

In a preferred embodiment of the apparatus a hinge means is provided at the partition wall itself or at the clamping device associated with it by which the partition wall can be pivoted about an axis of rotation. The pivotal movement which is provided takes place in such a way that the angle of inclination of the partition wall can be reduced or increased relative to the vertical direction. Through such a hinge means, the erecting of the partition wall and its erection of a vertical alignment, or with a small angle of inclination, for the purpose of the above described self stabilization is made easier. In this respect the suspension between the inner wall of the trough and the partition wall or the clamping device can be fixedly retained in a simple manner, since a pivotal movement of the partition wall via the hinge means does not bring about any rotational movement of the suspension means, such as for example clamping elements via which the partition wall or its clamping device is connected to the inner wall of the trough, relative to the inner wall of the trough, and thus in particular no vertical sliding movement of the suspension means results.

This hinge means can be provided at the partition wall itself or on the clamping device associated with it, or it can be formed as a connection of the partition wall to the clamping device. The axis of rotation about which the pivotal movement is executed extends in particular perpendicular to the longitudinal direction of the trough and also to the vertical direction. If two suspension points are provided for the coupling of a partition wall with the inner wall of the trough via the clamping device, then the axis of rotation, about which the partition wall is pivotable by means of the hinge means, can extend in particular parallel to the connection line between the two suspension points, or can be determined by this connection line itself.

In the above-described hinge means it is of advantage when the partition wall can be pivoted symmetrically with respect to a vertical alignment in two opposite directions through a respective pivot angle, so that the partition wall can be inserted into the inner wall of the trough optionally pivoted in the positive or negative direction.

The apparatus of the invention preferably has an apparatus for the insertion of the partition walls, at least in the filling zone, and an apparatus for the removal of the partition walls, at least in the cutting zone or in the discharge zone. These apparatuses can be designed for the insertion or removal of the partition walls in the inclined state in each case, so that a partition wall can for example already be inclined relative to the vertical before or during the insertion into the inner wall of the trough, and can be coupled to the inner wall of the trough in the inclined position directly after its insertion by means of the clamping device. These apparatuses are preferably designed in such a way that the partition walls can be selectively inserted or removed with a positive or a negative angle of inclination.

The object of the invention is also satisfied in that at least one partition wall has an increased roughness at least regionally at its end surface confronting the inner wall of a trough.

In the design of the partition wall in accordance with the invention, a region of the end of the partition wall facing the inner wall of the trough thus has a surface micro-geometry, which other regions or side or end faces of the partition wall do not have in favor of a smoother design.

In this way the friction between the partition wall and the inner wall of the trough to be coupled with it can be increased. Thus, a partition wall which is secured by means of the clamping device to the inner wall of the trough can withstand the higher pressure which is exerted by a liquid located in a cell bounded by the partition wall. An increased friction with respect to a relative movement of the partition wall and the inner wall of the trough in the longitudinal direction of the trough can thereby prevent slippage or tilting away of the partition wall along the inner wall of the trough in the direction of the transverse force resulting from the hydrostatic pressure. This applies to both partition walls installed vertically in the trough and also to partition walls installed in an inclined position in the trough.

Through a design of this kind of the apparatus or of its partition walls it is also possible to accommodate higher pressure differences in a partition wall between adjacent cells than in the known apparatuses. In this way the remaining design of the apparatus and also the production processes which can be carried out with it are advantageously made easier in the same way as described in connection with the embodiment of the apparatus in accordance with the invention with inclined partition walls.

The said end surface of the partition wall is in particular a narrower side or a peripheral side of the preferably substantially areal partition wall. In particular, when only a region of the partition wall end surface confronting the inner wall of the trough rather than the whole end surface confronting the inner wall of the trough has an increased roughness, then this region of increased roughness does not essentially hinder the tensioning of the inner wall of the trough around the partition wall or around the said end surface.

The advantageously increased friction between a partition wall and the inner wall of the trough with respect to the relative movement in the longitudinal direction of the trough can already be achieved when using known materials with a roughness of approximately 0.8 μm to 1.0 μm, with the statements in the description or the claims concerning the size of the roughness relating to the arithmetical mean roughness value $R_a$. The above values can be advantageously and easily achieved with the usual roughening processes, such as, for example, sand blasting, and they correspond to both the requirements so far as hygiene is concerned and also to the usual guidelines for designs.

It is preferred when the region of increased roughness extends around the center of the end surface of the partition wall confronting the inner wall of the trough. In particular, when the outline of the partition wall has essentially the shape of a semi-circle of a circular segment, a region of increased roughness can extend along a symmetrical angular zone around the center of the inner wall of the trough which is preferably less than 90° and for example between 40° and 45°. In this way the friction between the partition wall and the inner wall of the trough is increased with respect to a relative movement in the longitudinal direction of the trough, while the inner wall of the trough can slide particularly easily in a direction perpendicular to the longitudinal direction of the trough, along the region of the partition wall end surface which does not have an increased roughness, during the coupling of the partition wall to the inner wall of the trough by means of the clamping device.

The invention operates particularly well when a partition wall is provided along its end surface confronting the inner wall of the trough with a rooflike edge having two adjacently extending roof surfaces which include an internal angle of approximately 90°. With a design of this kind the partition wall coupled to the inner wall of the trough is particularly effectively connected to the latter. In order to move the partition wall along the inner wall of the trough in the longitudinal direction of the trough, against the frictional force caused by the clamping device, an additional "walking" work must be carried out at the inner wall of the trough so that this design of the partition walls of the apparatus of the invention is still further stabilized against transverse forces which result from differences in the filled level of adjacent cells.

In the case of the roof-like design of the peripheral edge of a partition wall it has proved to be particularly advantageous when the outer radius of the edge cross-section amounts to approximately 0.5 mm. In this case it is possible to preclude with special reliability that the inner wall of the trough, when constructed of the usual plastic materials, is damaged by the peripheral edge.

It is particularly advantageous when, in an apparatus of the initially named kind, the partition walls have an increased roughness regionally at their peripheral end surface and are clamped to the inner wall of the trough in an inclined position. With this combination a partition wall is able to withstand in a particularly effective manner a hydrostatic pressure which can originate from two neighboring cells bounded by the partition wall.

Further preferred embodiments of the invention are described in the subordinate claims.

BRIEF DESCRIPTION OF THE DRAWINGS

The invention will be described with reference to embodiments and to the following drawings.

DESCRIPTION OF THE PREFERRED EMBODIMENT

Figure 1:
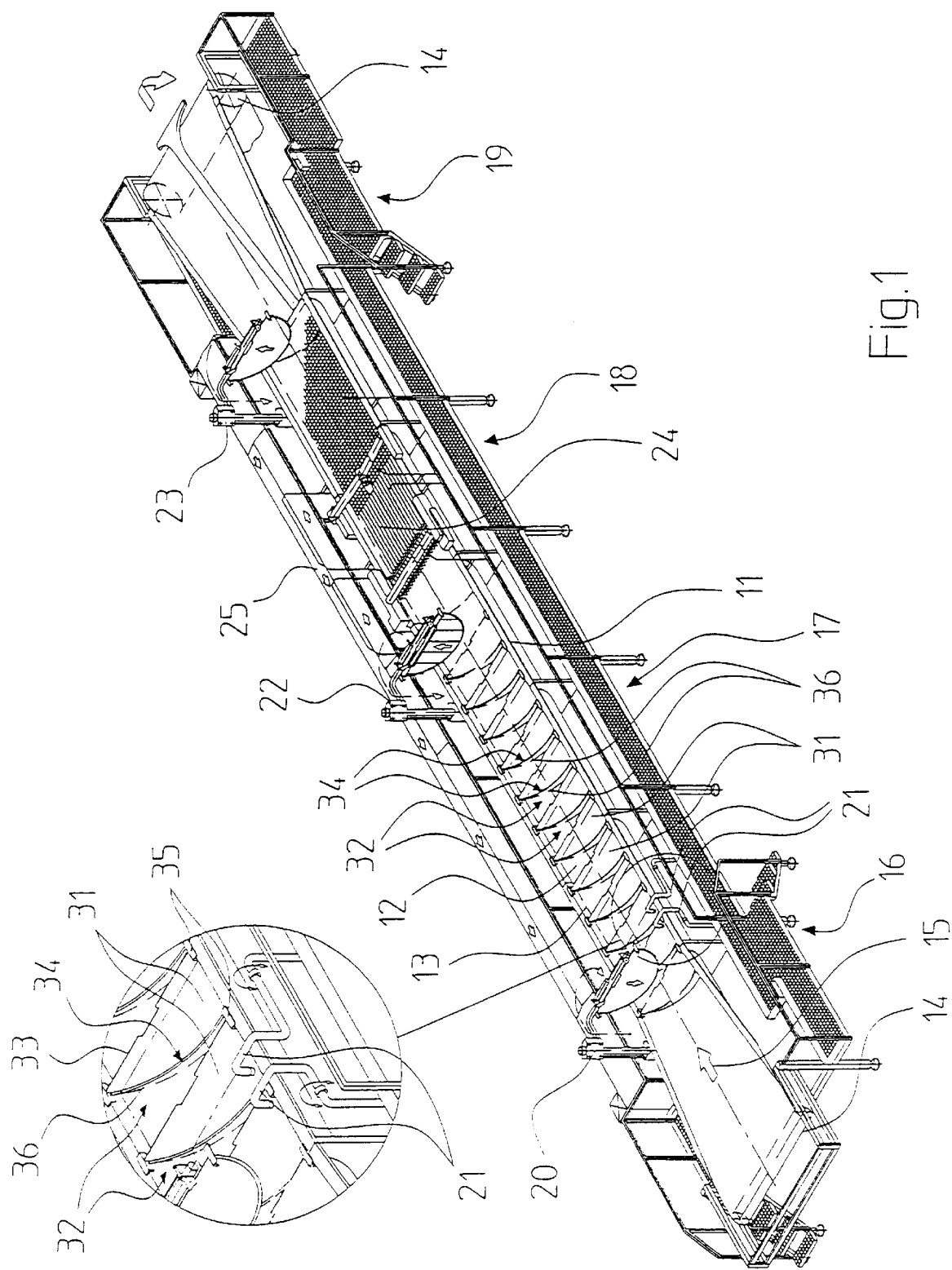
FIG. 1 is a schematic perspective overall view of an embodiment of an apparatus in accordance with the invention.

FIG. 1 shows a perspective overall view of an embodiment of an apparatus in accordance with the invention with the following basic layout: The apparatus has an elongate trough 11 of stainless steel the upper inner side of which has essentially the shape of a semi-circle in cross-section. A trough inner wall 12 lies on the inner side of the trough 11. The trough inner wall thus likewise has the contour of a semi-circle in the region of the trough 11 and in each case an upper marginal region 13 of the trough inner wall 12 projects upwardly beyond the two longitudinal sides of the trough 11.

The inner wall 12 of the trough is formed as an endless plastic belt of approximately 5 mm thickness. It extends beyond the two longitudinal ends of the trough 11, in each case in the direction of the respective conveying roller 14 against which the inner wall 12 of the trough lies with a straight contour and at which it is deflected through 180°. During the transport of the inner wall 12 by means of the conveying rolls 14 the upper half of the inner wall 12 moves in the direction 15.

Along this transport direction 15 the trough 11 or the trough in the wall 12 has a filling zone 16, a coagulation zone 17, a cutting zone 18 and a discharge zone 19. A partition wall insertion device 20 and also two directly adjacent filling tubes 21 are arranged in the filling zone 16. Partition wall removal devices 22 and 23 are respectively located in the cutting zone 18 and in the discharge zone 19. Moreover, the cutting zone 18 has a cutting device 24. A partition wall return transport device 25 extends adjacent to the trough 11, at the side parallel to its longitudinal direction.

Between the insertion device 20 and the removal device 22 of the cutting zone 18 the inner volume of the trough 11 or of the trough inner wall 12 is subdivided by equidistant partition walls 31 into cells 32 of the same length, i.e. of the same extent in the transport direction 15. Each partition wall 31 is formed as a disc of stainless steel of approximately 10 mm thickness and has essentially the outline of a semi-circle, with the end surface being formed as a horizontally extending upper edge 33 and as a semi-circular peripheral edge 34 having an outer radius which corresponds to the inner radius of the cross-sectional contour of the inner wall 12 of the trough.

The partition walls 31 are coupled by means of a clamping device not illustrated in FIG. 1 to the inner wall 12 of the trough in such a way that the end surface of the peripheral edge 34 contacts the inner wall 12 of the trough and the upper edge 33 extends perpendicular to the transport direction and opens at its two ends essentially at a suspension point 35 in the upper marginal region 13 of the inner wall 12 of the trough in each case. A relative tension force acting substantially vertically between the clamping device and the suspension point 35 of the inner wall 12 of the trough is exerted by the clamping device, by which the respective partition wall 31 and the inner wall 12 of the trough are pressed together with slight extension and deformation of the inner wall 12 of the trough.

In accordance with the invention the partition walls 31 are inserted obliquely into the inner wall 12 of the trough and coupled to the latter. The inclination of the partition walls 31 in the representation of the progressive production sequence in accordance with FIG. 1 is positive, i.e. it extends in such a way that the peripheral edge 34 is inclined into the transport direction 15 with respect to the horizontal upper edge 33; i.e. the partition wall 31 is thus inclined towards the cell 32 located in front of it in the direction 15. The peripheral edge 34 of the partition wall 31 thus extends along the inner wall 12 of the trough displaced in the transport direction 15 with respect to a vertical projection of the upper edge 33 of the inner wall of the trough. Moreover, a region of the peripheral edge 34 has, in accordance with the invention, a higher roughness than other regions or surfaces of the partition wall 31.

The precise design of the partition wall 31 and also the advantages which result from it will be described in more detail in the following with reference to FIGS. 2, 3a, 3b and 4.

The apparatus in accordance with the invention shown in FIG. 1 serves for the continuous coagulation of milk to cheese fragments. For this, cells 32 are formed by the inner wall 12 of the trough and by the partition walls 31 and are conveyed continually in the transport direction 15 by the conveyor rollers 14. The partition walls 31 are inserted into the inner wall 12 of the trough by the insertion device 20 in the filling zone 16 at an angle of inclination with respect to the vertical and are coupled to the inner wall 12 of the trough by actuation of the associating clamping device.

The cell 32 bounded by this partition wall 31 and located in the transport direction 15 with respect to the partition wall 31 can be filled with milk via the filling tubes 21. The coagulation process can take place within this cell 32 during the movement through the coagulation zone 17. In dependence on the type of cheese to be manufactured the partition wall 31 bounding the cell 32 in the transport direction 15 can be separated from the inner wall 12 of the trough and removed, either by the removal device 22 of the cutting zone 18, or by the removal device 23 of the discharge region 19. The partition walls 31 that are removed can be conveyed by the return transport device 25 back to the filling region 16. The cutting device 22 arranged between the two removal devices 22, 23 serves for cutting the cheese material into cheese fragments.

Through the design, in accordance with the invention, of the apparatus illustrated in FIG. 1, a simplification of the production sequences results in particular at the start of production, with a change of the type of cheese, and at the end of production.

Figure 2:
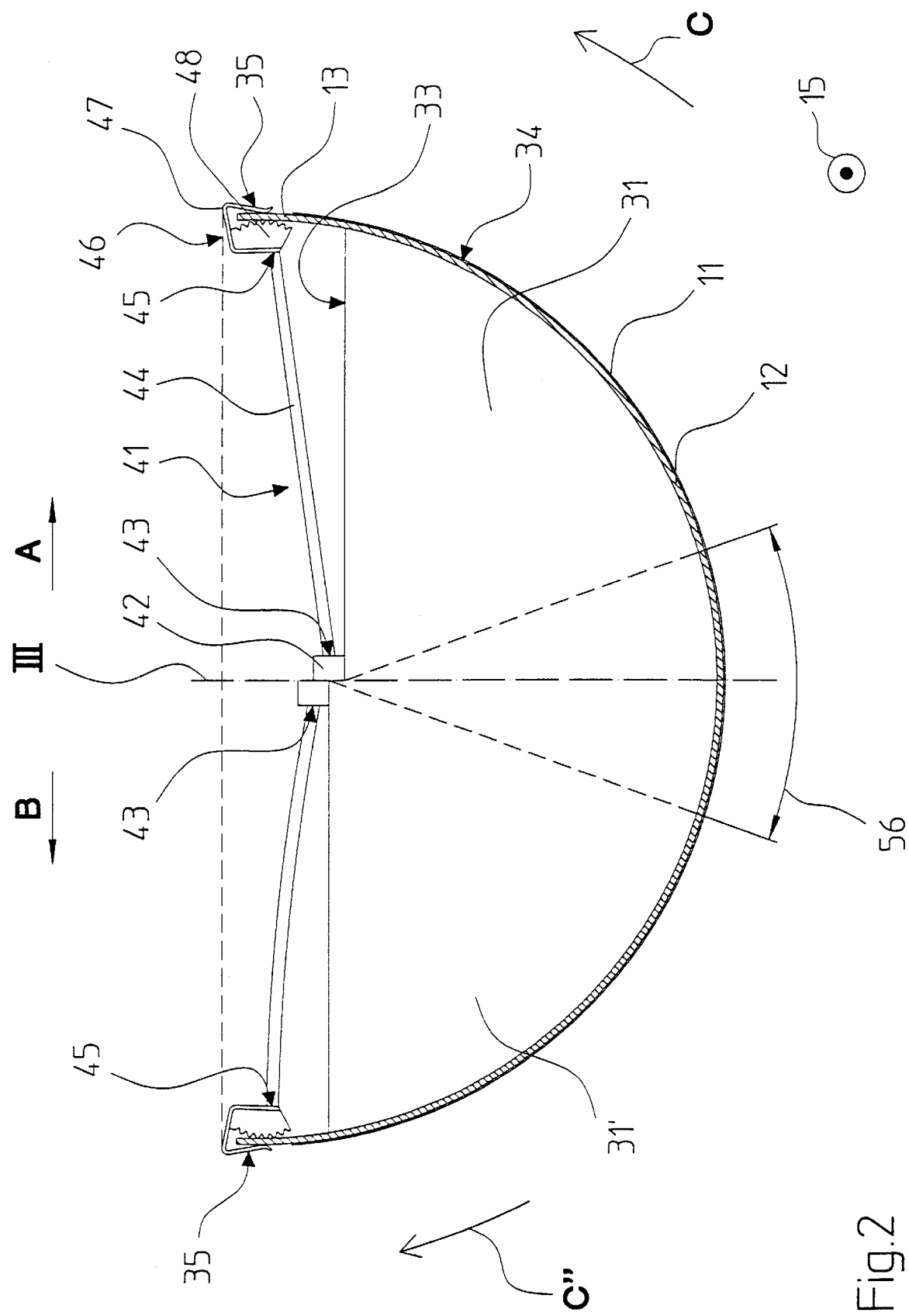
FIG. 2 is a schematic representation of a vertical section of the apparatus of FIG. 1 extending perpendicular to the transport direction, with the partition wall shown being located in an obliquely inserted state, in the representation in accordance with the right half of FIG. 2, and in the representation in accordance with the left half of FIG. 2 in an upright vertical alignment, FIG. 3a schematic views of a cross-section through this embodiment and 3b are along the plane III in accordance with FIG. 2 in the directions A and B respectively.
Figure 3:
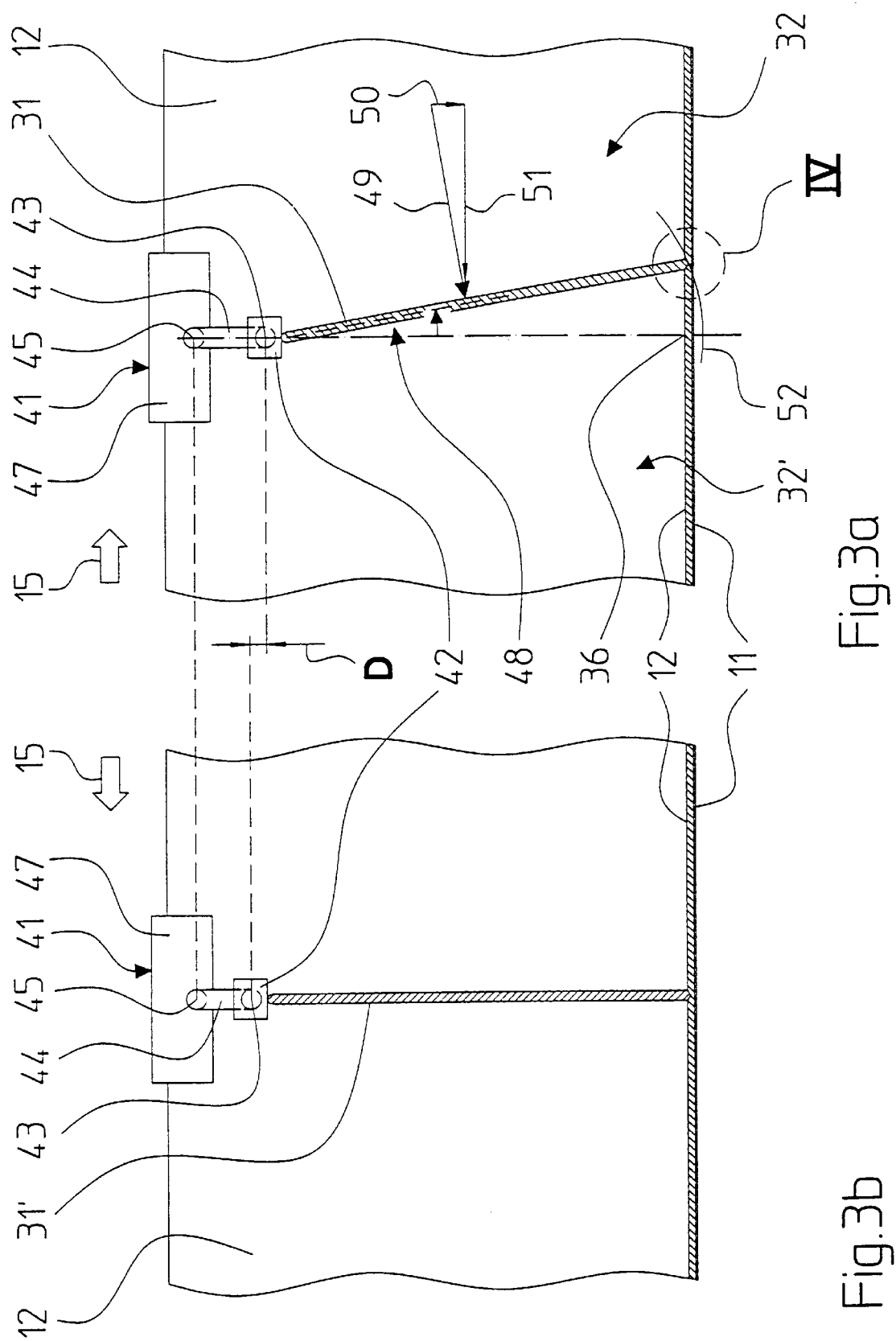
Figure 4:
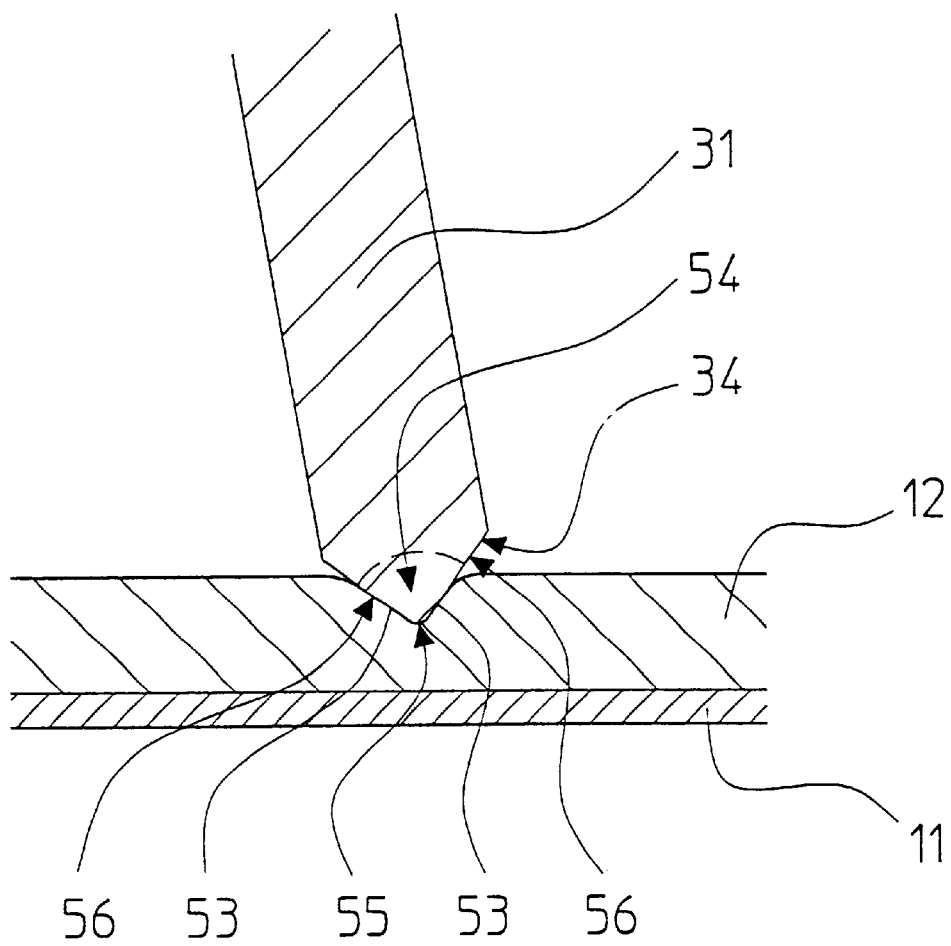
FIG. 4 is an enlarged, fragmentary view of a partition wall and the inner wall of the trough and shows the portion of FIG. 3a within circle IV in FIG. 4

FIG. 2 shows a vertical section extending perpendicular to the transport direction 15 of parts of the apparatus of FIG. 1. In this respect the right-hand half of FIG. 2 shows in particular an inclined partition wall 31 the peripheral edge 34 of which is displaced with respect to the upper edge 33 in the transport direction 15, i.e. out of the plane of the paper. The left-hand half of FIG. 2, which is delimited from the right-hand half by the plane III extending vertically and perpendicular to the plane of the paper, shows an upright partition wall 31' which is aligned parallel to the vertical direction. FIGS. 3a and 3b each show a view of the cross-section along the plane III of FIG. 2 in the directions A and B. FIG. 4 is a schematic detailed view of the circled region IV of FIG. 3a.

In FIG. 2 there can be seen the trough 11 and also the inner wall 12 of the trough contacting the inner side of the trough with the upper marginal regions 13 of the inner wall extending beyond the upper boundary of the trough 11. Furthermore, a partition wall 31, 31' is shown in the right- and left-hand halves of FIG. 2 respectively, which is coupled to the inner wall 12 of the trough by means of a clamping device 41 in each case. A clamping device 41 has a holder 42 with a first attachment point 43 arranged at the center of the upper edge 33 of the partition wall. A spring bar 44 is connected to the holder 42 at the attachment point 43 and extends perpendicular to the transport direction 15, i.e. within the plane of the paper in the direction of the upper marginal region 13 of the inner wall 12 of the trough.

The end of the spring bar 44 lying opposite to the attachment point 43 is connected at a second attachment point 45 to a clamping element 46. The clamping element 46 has a counter restraint yoke 47 with a U-shaped cross-section, the open side of which points downwardly. The two limbs of the counter restraint yoke 47 engage around the upper marginal region 13 of the inner wall of the trough 12 in each case at a suspension point 35. A zone of action 48 of the clamping element 46 is, moreover, located between the inner side of this upper marginal region 13 and the inner limb of the counter restraint yoke 47.

In the cross-sectional illustration of FIGS. 3a and 3b the only part of the clamping element 46 which can be seen is consequently the respective limb of the counter restraint yoke 47 confronting the inner side of the trough 11. This counter restraint yoke 47 is partly covered over by the spring bar 44 which also extends in the vertical direction. The two attachment points 43, 45 of the spring bar 44 are in each case indicated in broken lines.

As can be seen in the view of the cross-section through the right hand half of FIG. 2 shown in FIG. 3a the partition wall 31 is inclined, in accordance with the invention, with respect to the vertical through a positive angle of inclination 48 towards the right hand cell 32, i.e. the cell located in the transport direction 15. The angle of inclination 48 amounts to 10°. The positive inclination of the partition wall 31 shown in FIG. 3a corresponds generally to the direction of inclination of a partition wall 31 in the advanced sequence of the production, because the partition wall 31 particularly effectively bounds a newly formed and filled cell 32 with respect to a subsequent, still empty cell 32' which has yet to be formed. It is however also possible to couple the partition wall 31 to the inner wall 12 of the trough by means of the insertion device 20 at the same or at a different angle of inclination 48 in the negative direction, i.e. inclined towards the cell 32' arranged behind the partition wall 31 with respect to the direction of transport 15.

The partition wall 31, or 31', can be freely pivoted in the positive or negative direction of inclination with respect to the clamping device 41, and in particular with respect to the suspension point 35, by the angle of inclination 48. For this purpose the partition wall 31 or 31' is connected to the holder 42 via a hinge means not shown in the figures, so that the partition wall 31 or 31' can carry out a free pivotal movement about its upper edge 33 as an axis of rotation.

The partition wall 31 can be coupled to the inner wall 12 of the trough in known manner by means of the clamping device 41 after being inserted into the inner wall 12 of the trough. The upper marginal region 13 of the inner wall 12 of the trough is surrounded by the counter restraint yoke 47. During initial actuation of the clamping device 41 the zone of action 48 at the inner wall 12 of the trough is pressed so that the suspension point 35 is defined at which the clamping element 46 is fixed to the inner wall 12 of the trough. For this purpose the zone of action 48 has a corresponding surface shaping, such as for example a ribbing, and also a prestress which closes the clamping element 46. On releasing the clamping device 41 the clamping element 46 engages the inner wall 12 of the trough and then exerts an increasing clamping force by which the region of the inner wall 12 of the trough between the two suspension points 35 is tensioned along the peripheral edge 34 of the partition wall 31, in the tensioning directions C and C", for the mechanically stable coupling of the partition wall 31 and the inner wall 12 of the trough.

If the cell 32 provided in front of the partition wall 31 and illustrated in FIG. 3a with respect to the transport direction 15 is filled to a higher filling level, or with a liquid of higher density than the cell 32' lying opposite to the partition wall 31, then a pressure force 49 acts on the partition wall 31 which stands perpendicular to the partition wall 31, in such a way that its vertical component 50, evident from the illustrated triangle forces, is directed downwardly. Its horizontal component 51 is directed from the cell 32 to the partition wall 31 as a transverse force.

The partition wall 31 which is inclined with respect to the vertical in the illustration of FIG. 3a can withstand a high pressure force 49. On the one hand the vertical component 50 of the pressure force 49 brings about an increase of the contact pressure force acting by means of the clamping device 41 between the partition wall 31 and the inner wall 12 of the trough. An increase of this contact pressure force corresponds to an increase of the friction between the partition wall 31 and the inner wall 12 of the trough, so that the partition wall 31 shown in FIG. 3a can withstand a high liquid pressure acting in the direction of the pressure force 49.

On the other hand, a possible pivoting of the partition wall 31 in the direction of a vertical alignment brings about a further increase of the contact pressure force, and thus of the friction between the partition wall 31 and the inner wall 12 of the trough. If a hydrostatic pressure acting on the partition wall 31 brings about a transverse force 51 which is greater than the frictional force acting opposite to it between the peripheral edge 31 of the partition wall and the inner wall 12 of the trough then the peripheral edge 34 of the partition wall 31 begins to slide along the inner wall 12 of the trough in the direction of the horizontal component 51 of the pressure force 49.

In this way the partition wall 31 executes a pivotal movement about the hinge means of the holder 52, with the angle of inclination 48 gradually reducing and the horizontal projection of the outline of the partition wall onto the vertical increasing. This is illustrated with respect to the circle line 52 shown in FIG. 3a which is drawn in with the radius of the peripheral edge 34 of the partition wall 31 about the hinge means at the holder 42 as center.

Since the extent of the inner wall 12 of the trough downwardly is bounded by the trough 11, the upper edge 33 of the partition wall 31 or the holder 42 with the spring bar mounting point 43 must be moved upwardly for pivoting of the partition wall in the direction of a smaller angle of inclination 48. This brings about a further tensioning of the spring bar 44, so that the contact pressure force exerted on the partition wall 31 brought about by the clamping device 41 is still further increased. As already explained above this leads to an increase of the friction between the partition wall 31 and the inner wall 12 of the trough, which counteracts the transverse force 51.

The extreme case of such a pivotal movement is shown in the left-hand half of FIG. 2 and in FIG. 3b. Here the partition wall 31' stands parallel to the vertical, i.e. the angle of inclination 48 is zero. Accordingly the attachment point 43 of the spring bar 44 is increased by a distance D, relative to its position with an inclined partition wall 31 in accordance with the right-hand half of FIG. 2, i.e. in accordance with FIG. 3a. It should be noted that the point of attachment 45 of the spring bar 44 remains the same in both inclined positions of the partition wall 31, 31'; the clamping element 46 remains fixedly connected to the upper marginal region 13 of the inner wall 12 of the trough. For the sake of clarity, the figures do not show all the stabilizing means, which are provided to ensure that the elements of the clamping device 41 do not execute a rotational movement during a pivoting of the partition wall 31 clamped to the inner wall 12 of the trough in accordance with the illustration in FIG. 3a.

The increase in the stability of the partition walls 31 by their oblique insertion into the inner wall 12 of the trough in accordance with the invention functions particularly well when the peripheral edge 34 of a partition wall 31 is formed in accordance with the cross-sectional representation in FIG. 4. The peripheral edge 34 has two roof surfaces 53 which are arranged symmetrically to one another and include a roof angle 54 of approximately 90° with one another. The tip of the peripheral edge 34 formed by the two roof sides 53 now has the radius 55 of approximately 0.5 mm.

Through the design of the peripheral edge 34 shown in FIG. 4 the "walking" work necessary for a movement of the partition wall 31 along the inner wall 12 of the trough is advantageously increased, without the inner wall 12 of the trough being damaged by the peripheral edge 34.

In accordance with the invention, the partition walls 31 or 31' of the above described apparatus have an angular zone 56 of increased roughness extending symmetrically about the central plane III. This angular zone 56 is related to the center point of the circular line forming the peripheral edge 34 and it amounts in total to approximately 40° to 45°. The angular zone 56 extends along the two roof surfaces 53 of the peripheral edge 34. The roughness of the roof surfaces 53 amounts there to approximately between 0.8 μm and 1.0 μm, while the other side and end surfaces of a partition wall 31 or 31', in particular the remaining regions of the roof surfaces 53, have a lower roughness.

Through the provision of the roof surfaces 53 with an increased roughness along the angular zone 56 the frictional force which acts parallel to the transport direction 15 between the angular zone 56 of the partition wall 31 or 31', and the inner wall 12 of the trough coupled to the latter, is advantageously increased.

At the same time the frictional forces which act outside of the angular zone 56 between the partition wall 31 or 31' and the inner wall 12 of the trough remain substantially uninfluenced. These include those frictional forces which are directed opposite to the tension directions C and C", i.e. tangential to the peripheral edge 34 and perpendicular to the longitudinal direction 15. These frictional forces act, during the clamping of a partition wall 31 or 31' with the inner wall 12 of the trough, against a tangential relative movement of the inner wall 12 of the trough with respect to the peripheral edge 34. Thus these frictional forces counteract the coupling of a partition wall 31 or 31' with the inner wall 12 of the trough, and are thus undesired. Through the design of the invention with only the angular zone 56 of the peripheral edge having an increased roughness a region of the peripheral edge 34 remains, on which the inner wall 12 of the trough can advantageously move without increased friction for the coupling with the partition wall 31 or 31'.

Through the above-described design of the apparatus in accordance with the invention, in particular through the oblique insertion of the partition wall 31 and also by the design of the partition walls 31 or 31' with an angular zone 56 of increased roughness, it is possible to fill respective mutually adjacent cells 32, 32' to different heights. In particular a partition wall 31 inserted obliquely into the inner wall 12 of the trough and having such a roughened zone 56 is able to bound a fully filled cell 32 to which the partition wall 31 is inclined relative to an empty cell 32' away from which the partition wall 31 is directed, at least for a period of time. In this way the sequential cells can in each case be fully filled in one pass in a direct time sequence which advantageously simplifies the production sequences which are to be carried out with the apparatus.

What is claimed is:

1. Apparatus for obtaining cheese material from milk comprising an elongated trough made of a flexible material and an inner wall formed by the material, the trough being substantially continuously movable in a longitudinal direction of the trough between a filling zone and a discharge zone; a plurality of spaced-apart partition walls located along a length of the trough and dividing the trough into a plurality of cells each defined by a portion of the inner wall and opposing sides of proximate partition walls; and a clamping device for and operatively coupled to each partition wall, the clamping device securing the partition wall to the trough so that a peripheral region of the partition wall confronts and engages the inner wall of the trough to form a mechanically stable connection and a seal between the peripheral region and the inner wall and thereby also form a seal between proximate cells divided by the partition wall, the clamping device positioning at least one of the partition walls so that it is angularly inclined with respect to a vertical direction.

2. Apparatus according to claim 1 wherein the partition wall has one of a positive and a negative angle of inclination relative to the vertical direction.

3. Apparatus according to claim 1 wherein the cells are adapted to be filled with a liquid during use, and wherein the at least one of the partition walls and the clamping device associated therewith are configured to absorb forces generated by the liquid in the cell and acting against the at least one of the partition walls while remaining angularly inclined relative to the vertical direction.

4. Apparatus according to claim 1 wherein at least one of the partition walls has an angle of inclination relative to the vertical direction of between about 3° and 10°.

5. Apparatus according to claim 4 wherein the angle of inclination is between about 4° and 7°.

6. Apparatus according to claim 1 including means permitting pivotal motions of at least one of the partition walls about an axis of rotation which is substantially perpendicular to the vertical and the longitudinal directions.

7. Apparatus according to claim 6 wherein the clamping device is attached to the trough at spaced-apart suspension points, and wherein the axis of rotation extends substantially parallel to a connection line between the suspension points.

8. Apparatus according to claim 1 including a device located at the filling zone for inserting the partition wall into the trough and a device located at the discharge zone for removing the partition wall from the trough, the insertion and removal devices being adapted to insert and remove, respectively, the partition walls substantially parallel to an inclination angle formed by the angularly inclined partition wall.

9. Apparatus according to claim 8 wherein the insertion device and the removal device are adapted to remove the partition walls at one of a positive angle and a negative angle of inclination relative to the vertical direction.

10. Apparatus for obtaining cheese material from milk comprising an elongated trough made of a flexible material and an inner wall formed by the material, the trough being substantially continuously movable in a longitudinal direction of the trough between a filling zone and a discharge zone; a plurality of spaced-apart partition walls located along a length of the trough and dividing the trough into a plurality of cells each defined by a portion of the inner wall and opposing sides of proximate partition walls; and a clamping device for and operatively coupled to each partition wall, the clamping device securing the partition wall to the trough so that a peripheral region of the partition wall confronts and engages the inner wall of the trough to form a mechanically stable connection and a seal between the peripheral region and the inner wall and thereby also form a seal between proximate cells divided by the partition wall, at least one of the partition walls having a surface exhibiting increased roughness at least in a vicinity of the peripheral region of at least one of the partition walls which contacts the inner wall of the trough when the at least one of the partition walls is in its operative position.

11. Apparatus according to claim 10 wherein the clamping device positions the at least one of the partition walls so that it forms an angle of inclination relative to a vertical direction.

12. Apparatus according to claim 10 wherein the increased roughness of the peripheral region is no more than about 1 μm.

13. Apparatus according to claim 10 wherein the increased surface roughness of the peripheral region is symmetrical about a center plane of the at least one of the partition walls and which intersects the peripheral region thereof.

14. Apparatus according to claim 13 wherein the increased surface roughness of the peripheral region extends over an arc no greater than 90°.

15. Apparatus according to claim 13 wherein the increased surface roughness of the peripheral region extends over an arc between about 40° and 45°.

16. Apparatus according to claim 10 wherein the peripheral region of the partition wall defines a roof-shaped edge formed by first and second ridge surfaces that are angularly inclined with respect to each other by about 90°.

17. Apparatus according to claim 16 wherein the peripheral region of the partition wall defines a rounded edge between the first and second ridge surfaces having a radius of approximately 0.5 mm.

* * * * *